July 19, 1949.   L. A. MAJNERI   2,476,378
VALVE ASSEMBLY
Filed March 12, 1945   2 Sheets-Sheet 1
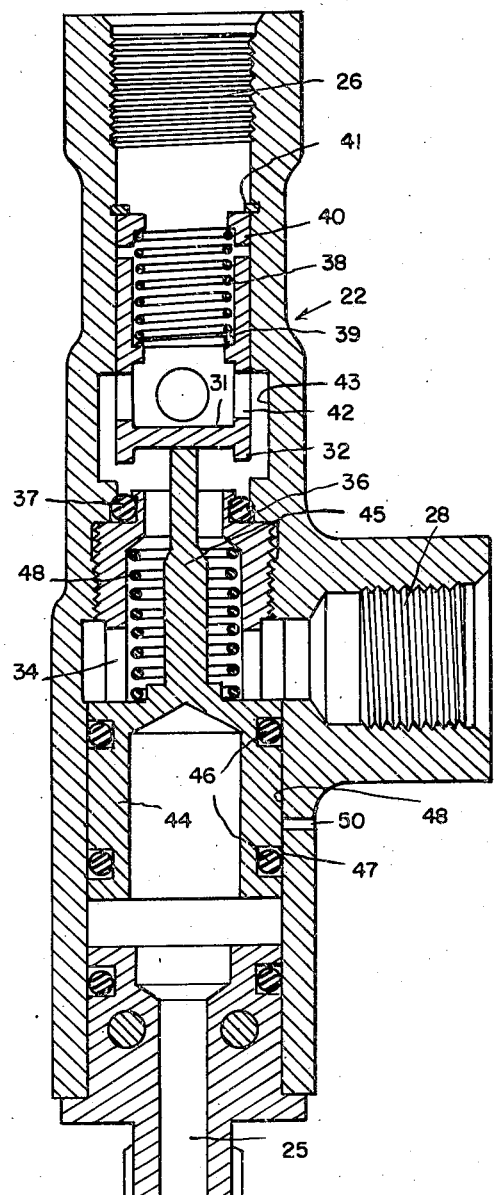
FIG.3.
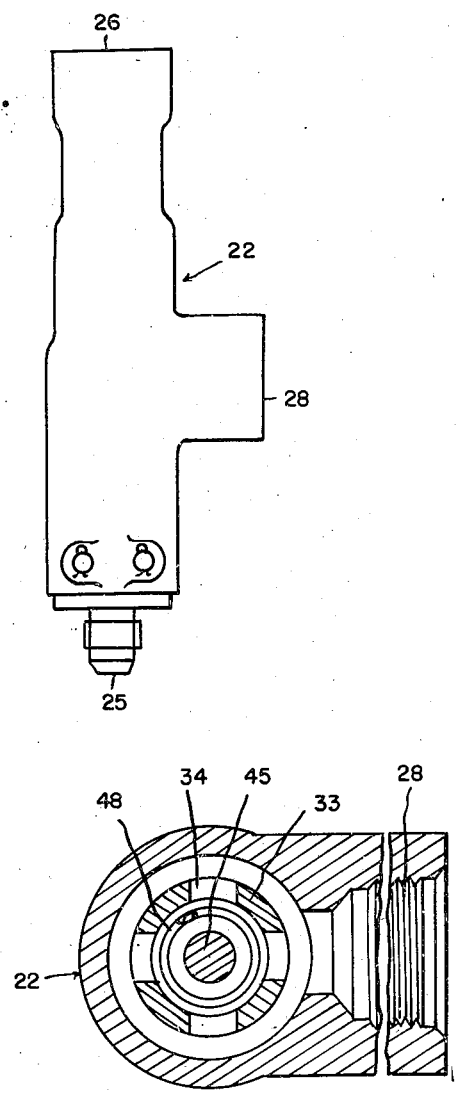
FIG.1.
FIG.4.
INVENTOR.
LUDWIG A. MAJNERI
BY
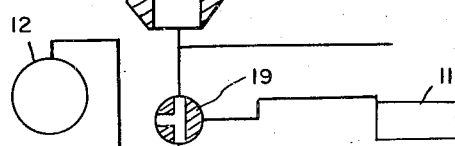
ATTORNEYS July 19, 1949.　　　　　L. A. MAJNERI　　　　　2,476,378
VALVE ASSEMBLY Filed March 12, 1945　　　　　　　　　　　　　　　2 Sheets-Sheet 2

INVENTOR.
LUDWIG A. MAJNERI
BY
Whittemore, Hulbert & Belknap
ATTORNEYS

Patented July 19, 1949

2,476,378

UNITED STATES PATENT OFFICE 2,476,378

VALVE ASSEMBLY

Ludwig A. Majneri, Grosse Pointe, Mich., assignor to The Warner Aircraft Corporation, Detroit, Mich., a corporation of Michigan Application March 12, 1945, Serial No. 582,208

2 Claims. (Cl. 137—153)

This invention relates generally to valve assemblies and refers more particularly to valve assemblies for use in connection with hydraulic landing gear retracting units for aircraft.

The retractable landing gear for aircraft is usually operated hydraulically by a cylinder and piston unit. The piston is automatically connected to at least one of the ground engaging wheel supporting struts and the lower end of the cylinder is alternatively connected to a source of hydraulic fluid medium under pressure and to a reservoir for respectively raising and lowering the wheel with respect to the aircraft. It has been the practice to also employ a mechanical latch or stop of some type to hold the ground engaging wheel in its extended or ground engaging position with respect to the aircraft.

The present invention enables eliminating the mechanical latching mechanism by locking or trapping hydraulic fluid medium in the wheel retracting cylinder above the piston when the latter is moved to its wheel extended position and it is, therefore, an object of this invention to provide a valve assembly which operates in timed relation to movement of the piston in the cylinder to trap fluid in, or release the same from, the upper end of the cylinder.

The foregoing as well as other objects will be made more apparent as this description proceeds, especially when considered in connection with the accompanying drawings, wherein:

Figure 1 is a side elevation of a valve assembly constructed in accordance with this invention;

Figure 3 is a longitudinal sectional view through the valve assembly showing the parts thereof in a different position; and Figure 4 is a cross sectional view taken substantially on the plane indicated by the line 4—4 of Figure 2.

Figure 2:
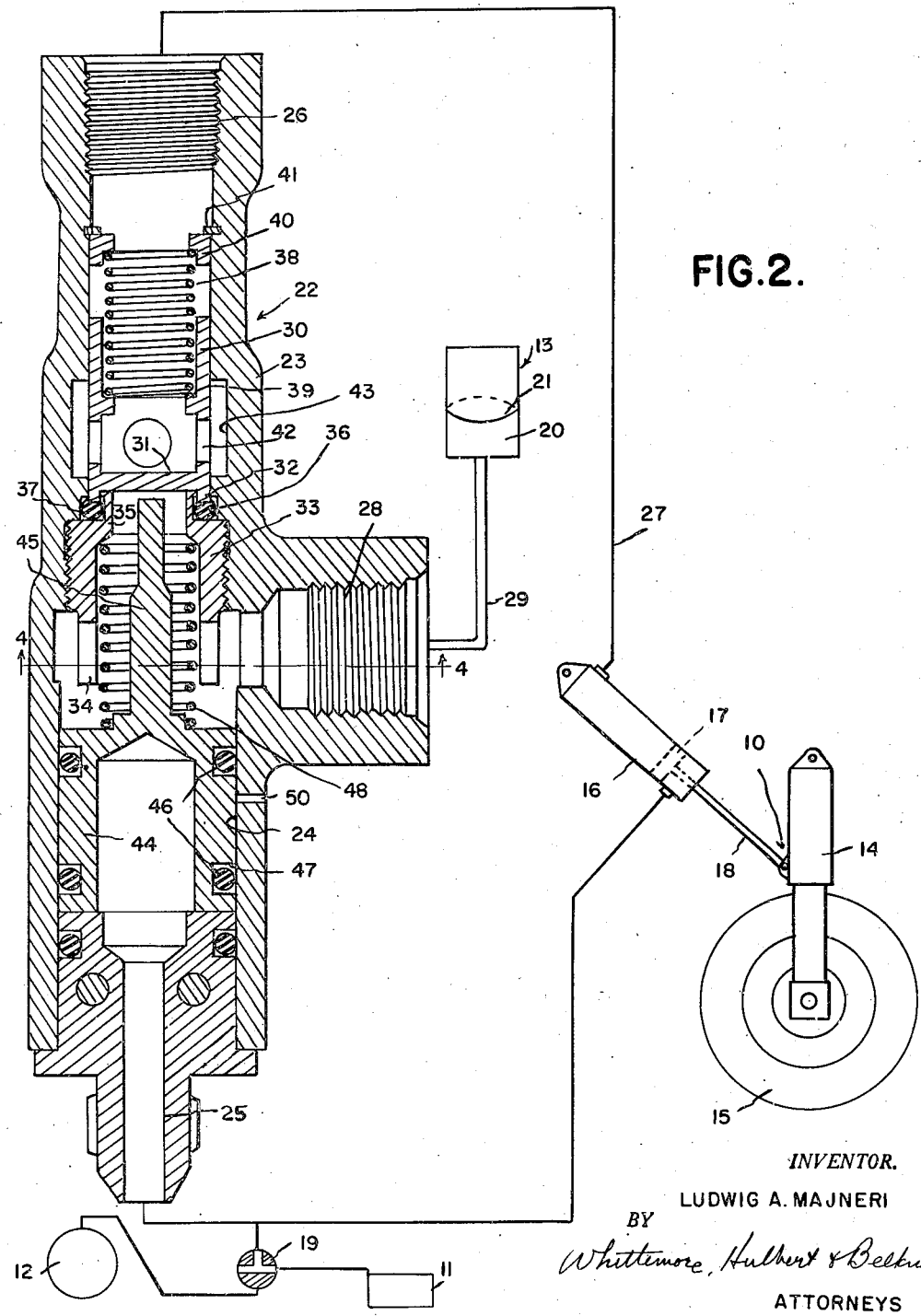
Figure 2 is an enlarged longitudinal sectional view of the valve shown in Figure 1 and also illustrates diagrammatically several instrumentalities of the hydraulic system for operating the retractable landing gear.

In Figure 2 of the drawings, I have shown one type of hydraulic system employed in connection with aircraft for operating the retractable landing gear. In general, the system shown comprises a wheel retracting unit 10, a reservoir 11 for storing hydraulic fluid medium, an accumulating chamber 12 containing hydraulic fluid medium under pressure and a combined storage and fluid pressure supply device 13.

In the interests of simplicity, only one ground engaging wheel retracting unit 10 is shown, although it will be understood as this description proceeds that any number of units may be employed in the hydraulic system. In detail the unit 10 comprises a strut 14 pivotally supported at its upper end to the aircraft in any suitable manner and having means at the lower end for rotatably supporting a ground engaging wheel 15. The strut 14 is swung upwardly to retract the wheel 15 by a hydraulic cylinder 16 and a piston 17 supported in the cylinder for reciprocation relative to the latter. The piston 17 is connected to the strut 14 intermediate the ends of the latter by means of a rod 18 so that the reciprocable movement of the piston in the cylinder is transferred to the strut 14 and swings the latter, together with the wheel 15, in opposite directions about the pivotal support for the strut.

The lower end of the cylinder 16 is alternatively connected to the reservoir 11 and accumulating chamber 12 through a three-way valve 19. When the valve 19 is in the position thereof shown in Figure 2, the lower end of the cylinder 16 is connected to the reservoir 11, and when the valve 19 is in the position shown in Figure 3, the lower end of the cylinder 16 is connected to the accumulator 12.

The device 13 comprises a chamber 20 having a flexible diaphragm 21 forming the top wall of the chamber 20. The volume of the chamber 20 is predetermined to accommodate sufficient hydraulic fluid medium to fill the space in the cylinder 16 above the piston 17 when the latter is in its lowermost position. As will be presently described, the chamber 20 communicates with the upper end of the cylinder 16 to supply hydraulic fluid medium to the portion of the latter above the piston when the piston is in its lowermost position and to receive the fluid medium in the upper portion of the cylinder when the piston 17 is moved upwardly in the cylinder 16.

The passage of fluid medium between the device 13 and cylinder 16 is controlled by a valve assembly 22, which also operates to trap the fluid medium in the upper end of the cylinder 16 and thereby hold the piston 17 in its wheel extended position shown in Figure 2 of the drawings. The valve 22 comprises a casing 23 having a cylindrical valve chamber 24 provided with ports 25 and 26 at opposite ends thereof. The port 25 is alternatively connected to the reservoir 11 and accumulator chamber 12 through the valve 19 while the port 26 is connected to the upper end of the cylinder 16 by a conduit 27. The valve chamber 24 is also provided with a port 28 intermediate the ends and the port 28 is connected to the chamber 20 of the device 13 by a conduit 29.

A valve member 30 is supported in the chamber 24 for sliding movement between the port 26 and the port 28. This valve member is in the form of a sleeve closed at its lower end by a wall 31 and having a downwardly extending annular flange 32 beyond the wall 31. The lowermost position of the valve member 30 in the valve chamber 24 is determined by a sleeve 33 threaded in a portion of the chamber 24 directly above the port 28 and having radial openings 34 in the lower end thereof opposite the port 28. The upper end of the sleeve 33 is provided with a reduced annular extension 35 which engages the wall 31 on the valve member 30 and forms a stop to limit the extent of downward movement of the valve member in the chamber 24. Also the annular reduced portion 35 cooperates with an annular groove 36 formed in the inner wall of the chamber 24 to provide a space for accommodating an O-ring seal 37. The seal 37 is engaged by the annular flange 32 in the lowermost position of the valve member 30 to prevent the escape of fluid under pressure around the valve member when in the latter position thereof. It is pointed out at this time that when the valve is moved to its lowermost or seating position shown in Figure 2, the stress is taken by the sleeve 33 and the O-ring seal is thereby relieved of this stress. This feature greatly increases the life of the seal and assures satisfactory operation over a long period of time.

The valve member 30 is normally urged to the position thereof shown in Figure 2 by a relatively weak spring 38 having the lower end extending into the valve member 30 and engageable with an internal shoulder 39 formed on the valve member. The upper end of the spring engages an abutment 40 in the form of a ring which is held in place in the chamber 24 by a snap ring 41. It will also be noted that the side wall of the valve member 30 adjacent the end wall 31 is formed with radial openings 42 and the latter communicate with an annular chamber 43 formed in the valve casing 23.

The valve member 30 is moved upwardly to the position shown in Figure 3 of the drawings by a plunger 44 reciprocably mounted in the valve chamber 24 below the port 28 and having an upwardly projecting reduced stem portion 45 for engaging the end wall 31 of the valve member 30. The leakage of hydraulic fluid medium around the plunger 44 is prevented by a pair of axially spaced O-ring seals 46 respectively retained in grooves 47 formed in the plunger.

When the parts are in the relative positions thereof shown in Figure 2 of the drawings, the valve member 30 is in its closed position and hydraulic fluid medium is trapped in the portion of the cylinder 16 above the piston 17 in order to hold the ground engaging wheel 15 in its extended position. Assuming now that it is desired to retract the ground engaging wheel 15, the valve 19 is moved to the position shown in Figure 3 to connect the accumulator 12 to both the lower end of the cylinder 16 and to the lower end of the valve 22. The fluid under pressure admitted to the valve 22 acts on the plunger 44 and moves the latter upwardly against the action of the spring 48. As the plunger moves in an upward direction, the stem 45 engages the end wall 31 on the valve member 30 and moves the latter upwardly against the action of the spring 38. In this position of the valve member 30, hydraulic fluid medium is permitted to flow from the upper end of the cylinder 16 into the valve chamber 24 through the port 26 and passes through the radial ports 42 to the port 28. From the port 28, the hydraulic fluid medium flows into the chamber 20 and the diaphragm 21 is extended to accommodate this fluid. The hydraulic fluid medium in the cylinder 16 above the piston 17 is actually displaced by upward movement of the piston 17 in response to the accumulator pressure acting on the bottom of the piston and the latter is maintained in its retracted position by this accumulator pressure.

Assuming now that it is desired to lower the ground engaging wheel 15, the valve 19 is returned to the position shown in Figure 2 of the drawings, wherein the lower end of the valve 22 and the corresponding end of the piston 16 is connected to the reservoir 11. Due to this resulting drop in pressure in the cylinder 16 below the piston 17, the latter is moved downwardly under the action of gravity to lower the wheel 15. Also the spring 48 moves the plunger 44 downwardly in the valve chamber 24 and permits the valve 30 to close under the action of the spring 38. However, the hydraulic fluid medium in the device 13 is now free to act on the wall 31 of the valve member 30 and this fluid medium moves the valve member 30 to its open position. As a result, the hydraulic fluid medium from the chamber 20 in the device 13 flows out of the port 26 and into the upper end of the cylinder 16. After the hydraulic fluid medium is transferred from the device 13 to the upper end of the cylinder 16, the valve member is closed by the spring 38 and the fluid is trapped in the cylinder 16 above the piston 17.

With the above in view, reference is again made to Figures 2 and 3 of the drawings, wherein it will be noted that the valve casing 23 is provided with a restricted port 50 opposite the portion of the plunger 44 between the O-ring seals 46. The arrangement is such that hydraulic fluid medium escaping past either seal flows out of the valve casing through the port 50 and serves as an indication that fluid under pressure is either escaping from the storage device 13 or is leaking into the device 13 from the port 25. The capacity of the storage device 13 is limited to the quantity of fluid required to fill the cylinder 16 above the piston 17 and, therefore, a continuous loss of fluid from the storage device 13 would eventually render the device inoperative to hold the wheel retracting mechanism in its extended position. On the other hand, escape of fluid from the port 25 to the device 13 would eventually result in an over-supply of fluid in the device 13 and this condition would also effect the operation of the device. Either of the above conditions are readily indicated, however, by leakage through the port 50 and the valve may be repaired or replaced before any great damage is done.

What I claim as my invention is:

1. A valve assembly comprising a case provided with a valve chamber having longitudinally spaced ports, means in the valve chamber providing an annular recess between said ports and having a portion forming the base of the recess, a sealing ring of resilient material housed in said recess and seated on the base portion, a sleeve-like valve member slidably supported in the valve chamber and having a closed end provided with an axially extending annular flange of a dimension predetermined to project into the annular recess and engage said sealing ring, said sleeve-like valve member having a port through one side wall communicating with the adjacent port in the valve chamber in the closed position of the valve member, means for limiting the pressure exerted on the sealing ring by the valve member, a plunger slidable in the valve chamber and having one end portion abutting the closed end of the valve member, and means for moving the plunger in a direction to move the valve member away from the sealing ring.

2. A valve assembly comprising a case provided with a valve chamber having longitudinally spaced first and second ports and having a third port intermediate the first and second ports, an annular valve seat located in the chamber between the first and third ports, a sleeve-like valve member slidably supported in the chamber between the valve seat and first port, the end of the valve member adjacent the valve seat being closed and having a portion engageable with the seat, the opposite end of the sleeve being open to the first port and the side wall of the sleeve having an opening therethrough registerable with an annular recess in the adjacent wall of the valve chamber, spring means normally urging the sleeve-like valve member into engagement with said seat, a plunger supported for sliding movement in the valve chamber between the second and third ports and having a projection extending through the valve seat into contact with the closed end of the sleeve-like valve member, said plunger being movable in a direction to unseat the valve member by fluid under pressure admitted to the valve chamber through the second port.

LUDWIG A. MAJNERI.

REFERENCES CITED

The following references are of record in the file of this patent:

UNITED STATES PATENTS

| Number | Name | Date |
| --- | --- | --- |
| 722,872 | Mowery | Mar. 17, 1903 |
| 1,438,928 | Lewis | Dec. 12, 1922 |
| 1,667,580 | Albrecht | Apr. 24, 1928 |
| 1,699,217 | Wilson | Jan. 15, 1929 |
| 2,001,620 | Levy | May 14, 1935 |
| 2,099,368 | Levy | Nov. 16, 1937 |
| 2,123,477 | Sheedy | July 12, 1938 |
| 2,294,918 | Levy | Sept. 8, 1942 |